United States Patent
Kinnaird et al.

(10) Patent No.: US 8,182,156 B2
(45) Date of Patent: May 22, 2012

(54) NESTED BEARING CAGES

(75) Inventors: Ray Harris Kinnaird, Ft. Thomas, KY (US); Ning Fang, West Chester, OH (US)

(73) Assignee: General Electric Company, Schenectady, NY (US)

(*) Notice: Subject to any disclaimer, the term of this patent is extended or adjusted under 35 U.S.C. 154(b) by 965 days.

(21) Appl. No.: 12/183,489

(22) Filed: Jul. 31, 2008

(65) Prior Publication Data

US 2010/0027930 A1   Feb. 4, 2010

(51) Int. Cl.
*F16C 27/00* (2006.01)

(52) U.S. Cl. .............. 384/535; 384/581; 415/174.2

(58) Field of Classification Search .......... 384/535, 384/536, 581, 582; 415/142, 170.1, 229, 415/174.2
See application file for complete search history.

(56) References Cited

U.S. PATENT DOCUMENTS

| | | | |
|---|---|---|---|
| 2,521,638 A * | 9/1950 | Lamm | 384/536 |
| 4,245,951 A | 1/1981 | Minnich | |
| 4,289,360 A | 9/1981 | Zirin | |
| 4,322,117 A | 3/1982 | Briggs | |
| 4,693,616 A | 9/1987 | Rohra et al. | |
| 4,872,767 A | 10/1989 | Knapp | |
| 5,080,555 A | 1/1992 | Kempinger | |
| 5,237,817 A | 8/1993 | Bornemisza et al. | |
| 6,413,046 B1 | 7/2002 | Penn et al. | |
| 6,439,772 B1 | 8/2002 | Ommundson et al. | |
| 6,447,248 B1 | 9/2002 | Kastl et al. | |
| 6,558,041 B2 | 5/2003 | Laos | |
| 6,679,045 B2 | 1/2004 | Karafillis et al. | |
| 6,821,083 B2 | 11/2004 | Lathrop et al. | |
| 7,384,199 B2 | 6/2008 | Allmon et al. | |
| 7,634,913 B2 | 12/2009 | Singh et al. | |
| 2008/0131277 A1 | 6/2008 | Shatz et al. | |
| 2009/0214147 A1 | 8/2009 | Duong | |
| 2010/0054650 A1 | 3/2010 | Endres et al. | |

* cited by examiner

*Primary Examiner* — William C Joyce
(74) *Attorney, Agent, or Firm* — David J. Clement; Trego, Hines & Ladenheim, PLLC

(57) ABSTRACT

A gas turbine engine bearing cage assembly includes: a first bearing cage having: an annular first bearing support ring; an annular first mounting flange; and an annular array of axially-extending first spring arms interconnecting the first bearing support ring and the first mounting flange, the first spring arms defining an outer diameter; and a second bearing cage having: an annular second bearing support ring; an annular second mounting ring, the second mounting ring defining an inner diameter greater that the outer diameter; and an annular array of axially-extending second spring arms interconnecting the second bearing support ring and the second mounting ring, the second spring arms defining spaces therebetween. The bearing cages are sized such that the first bearing cage can be received within the second bearing cage. The spaces are positioned to receive the first spring arms, permitting independent flexing motion of the first and second spring arms.

20 Claims, 4 Drawing Sheets

NESTED BEARING CAGES

BACKGROUND OF THE INVENTION

This invention relates generally to gas turbine engine bearings and more particularly to mounting arrangements for such bearings.

It is known to support bearings, such as the large rolling-element bearings used in gas turbine engines, using spring centering cages. The spring constant of such cages can be manipulated to provide a desired stiffness and consequently affect the dynamics and vibration modes of the engine. Particularly in large aircraft turbofan engines, it has been demonstrated that engine dynamics will suffer significantly if such cages are not used.

Many gas turbine engines have at least one sump that includes two or more rolling element bearings positioned in close proximity to each other. These sumps have limited axial and radial space available to be used for bearings, spring cages, intermediate gearbox mounting, damper housings, air and oil seals, air pressurization channels, and oil transport between parts of the sump. The axial and radial space needed for an individual spring centering cage for each bearing, which is greater than required for a conventional stiff bearing mounting, is inconsistent with the need to keep the engine as small and light as possible.

BRIEF SUMMARY OF THE INVENTION

These and other shortcomings of the prior art are addressed by the present invention, which provides bearing spring cages that are nested within each other, so as to operate independently, while only occupying the space normally required for a single spring bearing cage.

According to one aspect, a bearing cage assembly for a gas turbine engine includes: (a) a first bearing cage having: (i) an annular first bearing support ring; (ii) an annular first mounting flange; and (iii) an annular array of axially-extending first spring arms interconnecting the first bearing support ring and the first mounting flange, the first spring arms defining an outer diameter; (b) a second bearing cage comprising: (i) an annular second bearing support ring; (ii) an annular second mounting ring, the second mounting ring defining an inner diameter greater that the outer diameter; and (iii) an annular array of axially-extending second spring arms interconnecting the second bearing support ring and the second mounting ring, the second spring arms defining spaces therebetween. The bearing cages are sized such that the first bearing cage can be received within the second bearing cage and the spaces are positioned to receive the first spring arms therein, so as to permit independent flexing motion of the first and second spring arms.

According to another aspect of the invention, a bearing assembly for a gas turbine engine includes: (a) a first bearing cage having: (i) an annular first bearing race; (ii) an annular first mounting ring secured to a stationary member of the engine; and (iii) an annular array of axially-extending first spring arms interconnecting the first bearing race and the first mounting ring; (b) a rolling-element first bearing mounted in the first bearing support ring; (c) a second bearing cage comprising: (i) an annular second bearing race; (ii) an annular second mounting ring secured to a stationary member of the engine; and (iii) an annular array of axially-extending second spring arms interconnecting the second bearing race and the second mounting ring; (d) a rolling-element second bearing mounted in the second bearing support ring; and (e) a shaft mounted in the first and second bearings; (f) wherein the bearing cages are nested within each other such that the first and second spring arms are free to move independently of each other in a radial direction.

BRIEF DESCRIPTION OF THE DRAWINGS

The invention may be best understood by reference to the following description taken in conjunction with the accompanying drawing figures in which.

DETAILED DESCRIPTION OF THE INVENTION

Figure 1:
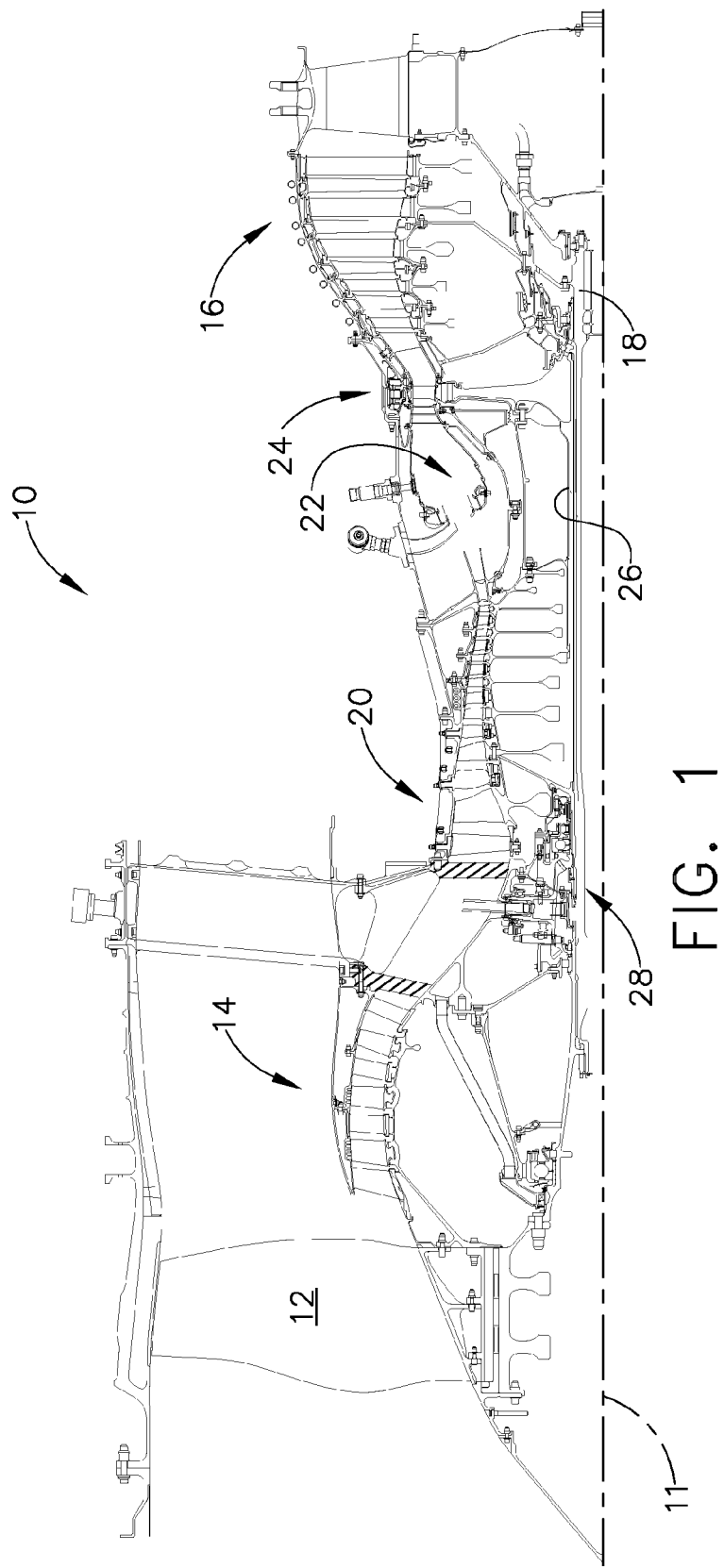
FIG. 1 is a half-sectional view of a gas turbine engine incorporating nested bearing spring cages constructed according to an aspect of the present invention.

Referring to the drawings wherein identical reference numerals denote the same elements throughout the various views, FIG. 1 depicts a gas turbine engine 10. The engine 10 has a longitudinal axis 11 and includes a fan 12, a low pressure compressor or "booster" 14 and allow pressure turbine ("LPT") 16 collectively referred to as a "low pressure system". The LPT 16 drives the fan 12 and booster 14 through an inner shaft 18, also referred to as an "LP shaft". The engine 10 also includes a high pressure compressor ("HPC") 20, a combustor 22, and a high pressure turbine ("HPT") 24, collectively referred to as a "gas generator" or "core". The HPT 24 drives the HPC 20 through an outer shaft 26, also referred to as an "HP shaft". Together, the high and low pressure systems are operable in a known manner to generate a primary or core flow as well as a fan flow or bypass flow. While the illustrated engine 10 is a high-bypass turbofan engine, the principles described herein are equally applicable to turboprop, turbojet, and turboshaft engines, as well as turbine engines used for other vehicles or in stationary applications.

Figure 2:
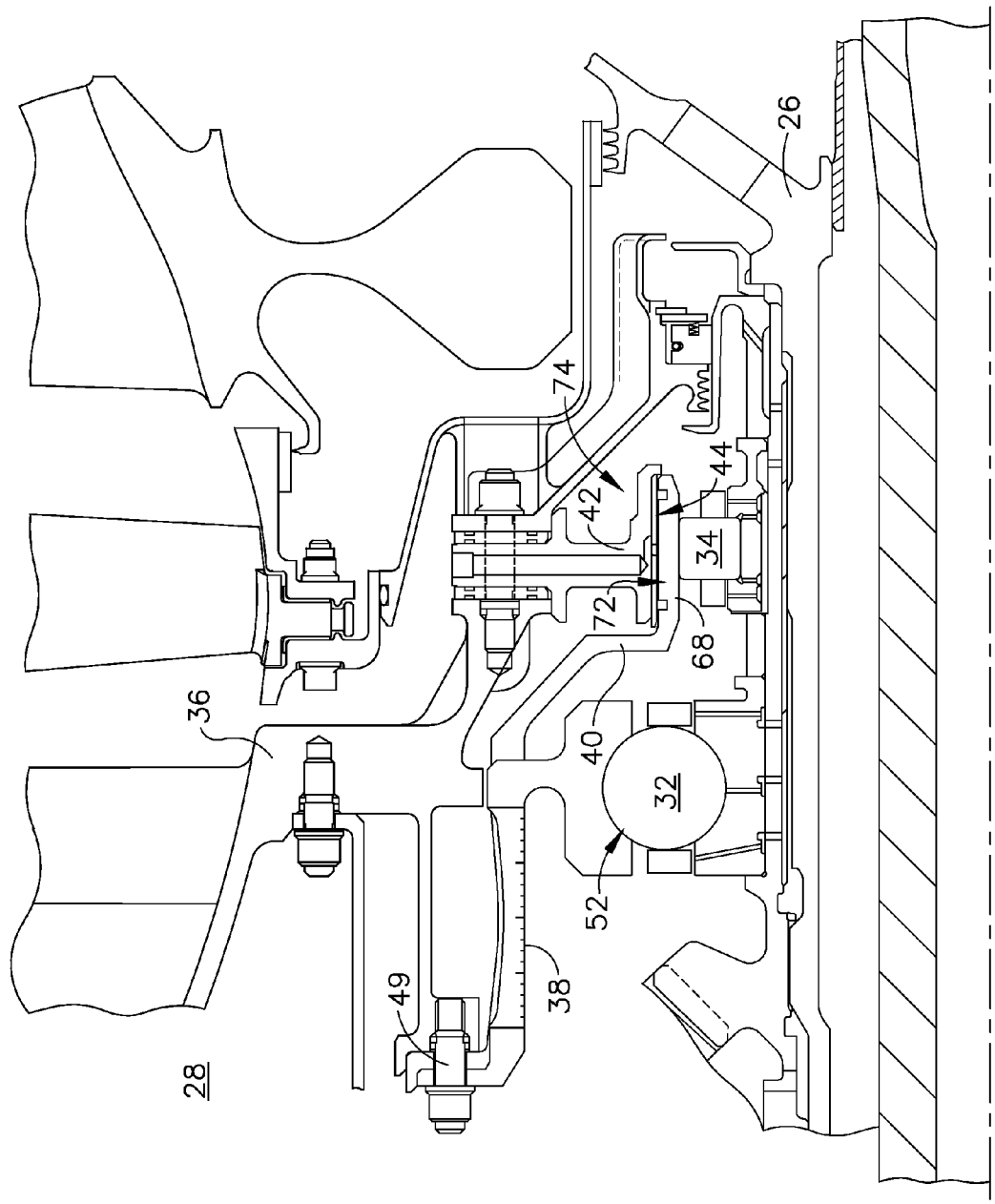
FIG. 2 is an enlarged view of a bearing compartment of the gas turbine engine of FIG. 1.

The inner and outer shafts 18 and 26 are mounted for rotation in several rolling-element bearings. The bearings are located in enclosed portions of the engine 10 referred to as "sumps". FIG. 2 shows a front sump 28 of the engine 10 in more detail. The forward end of the outer shaft 26 is carried by a ball forward bearing 32 and a roller aft bearing 34 which in common nomenclature are referred to as the "#3B bearing" and the "3R bearing", respectively. A static annular frame member referred to as a fan hub frame 36 surrounds the forward and aft bearings 32 and 34. The forward bearing 32 is connected to the fan hub frame 36 by a forward spring bearing cage 38, and the aft bearing 34 is connected to the fan hub frame 36 by an aft spring bearing cage 40. A stationary damper housing 42 with a cylindrical inner surface 44 surrounds the aft bearing 34.

Figure 3:
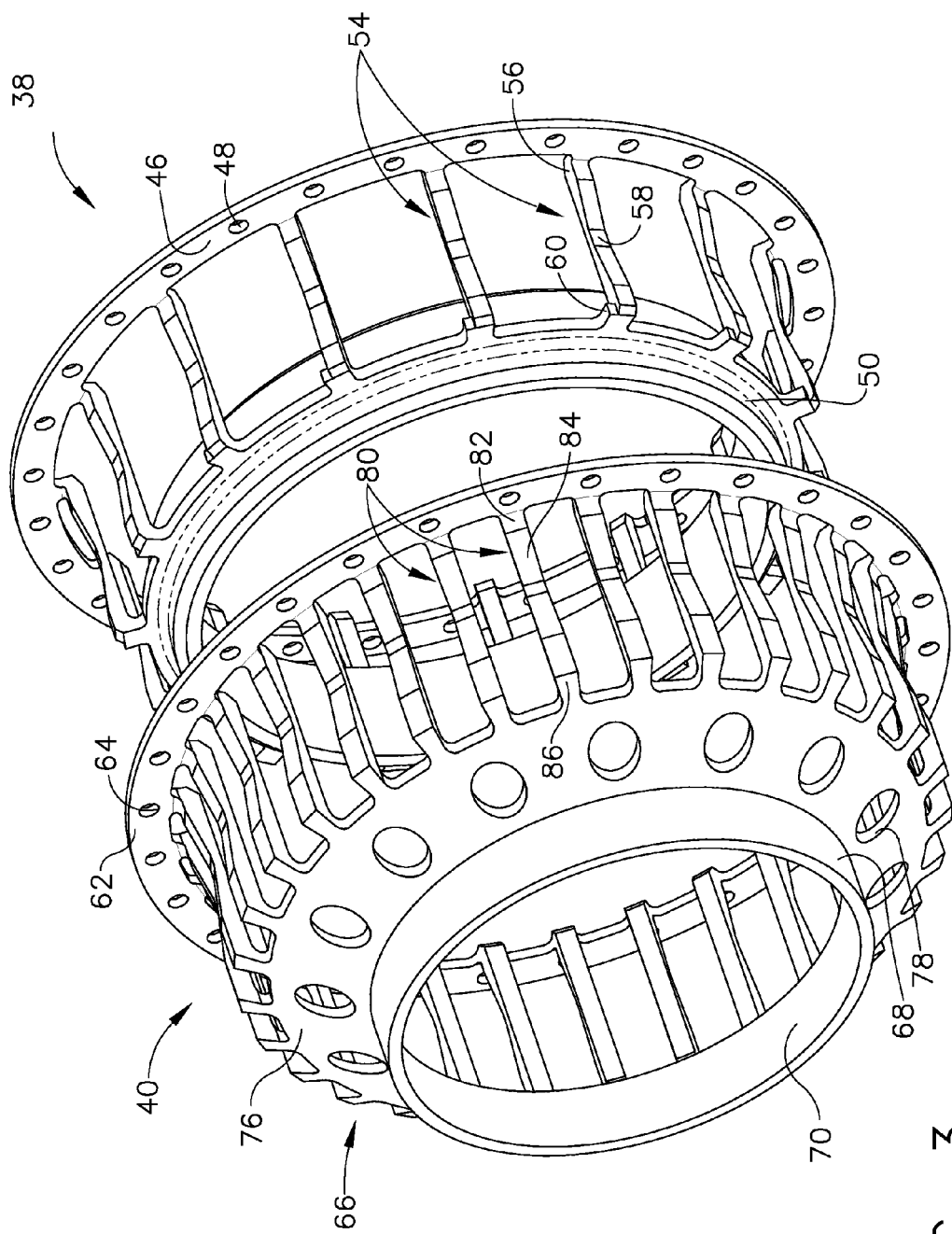
FIG. 3 is an exploded perspective view of a pair of bearing spring cages shown in FIG. 2.

FIG. 3 illustrates the forward and aft bearing cages 38 and 40 in more detail. The forward bearing cage 38 comprises an annular, radially-extending mounting flange 46 including a plurality of mounting holes 48 which receive fasteners 49 (see FIG. 2) and an annular, generally axially-extending bearing support ring 50. In this example the inner surface of the bearing support ring 50 has an arcuate cross-section groove 52 formed therein (see FIG. 2) and serves as an outer bearing race. The mounting flange 46 and the bearing support ring 50 are interconnected by a an array of spring arms 54. Each spring arm 54 comprises a radially-outwardly extending portion 56 adjacent the mounting flange 46, a central portion 58, and a radially-inwardly-extending portion 60 adjacent the bearing support ring 50. The number, shape, and dimensions of the spring arms 54 may be modified to suit a particular application, in particular to achieve a desired stiffness of the first bearing cage 38.

The aft bearing cage 40 is similar in construction to the forward bearing cage 38 and comprises an annular, radially-extending mounting flange 62 including a plurality of mounting holes 64 which receive fasteners 49 (see FIG. 2), and an annular bearing support ring 66. The bearing support ring 66 includes a generally axially-extending portion 68 with a cylindrical inner surface 70 that serves as an outer bearing race. As seen in FIG. 2, the outer surface 72 of the axially-extending portion 68, in cooperation with the damper housing 42, forms a portion of an oil film damper 74 of a known type. A frustoconical skirt 76 extends radially outwards from the bearing support ring 66. It has a number of vent holes 78 formed therein that facilitate the flow of scavenge oil through the front sump 28. The mounting flange 62 and the skirt 76 are interconnected by a an array of spring arms 80. Each spring arm 80 comprises a radially-outwardly extending portion 82 adjacent the mounting flange 62, a central portion 84, and a radially-inwardly-extending portion 86 adjacent the bearing support ring 66. The number, shape, and dimensions of the spring arms 80 may be modified to suit a particular application, in particular to achieve a desired stiffness of the second bearing cage 40.

Figure 4:
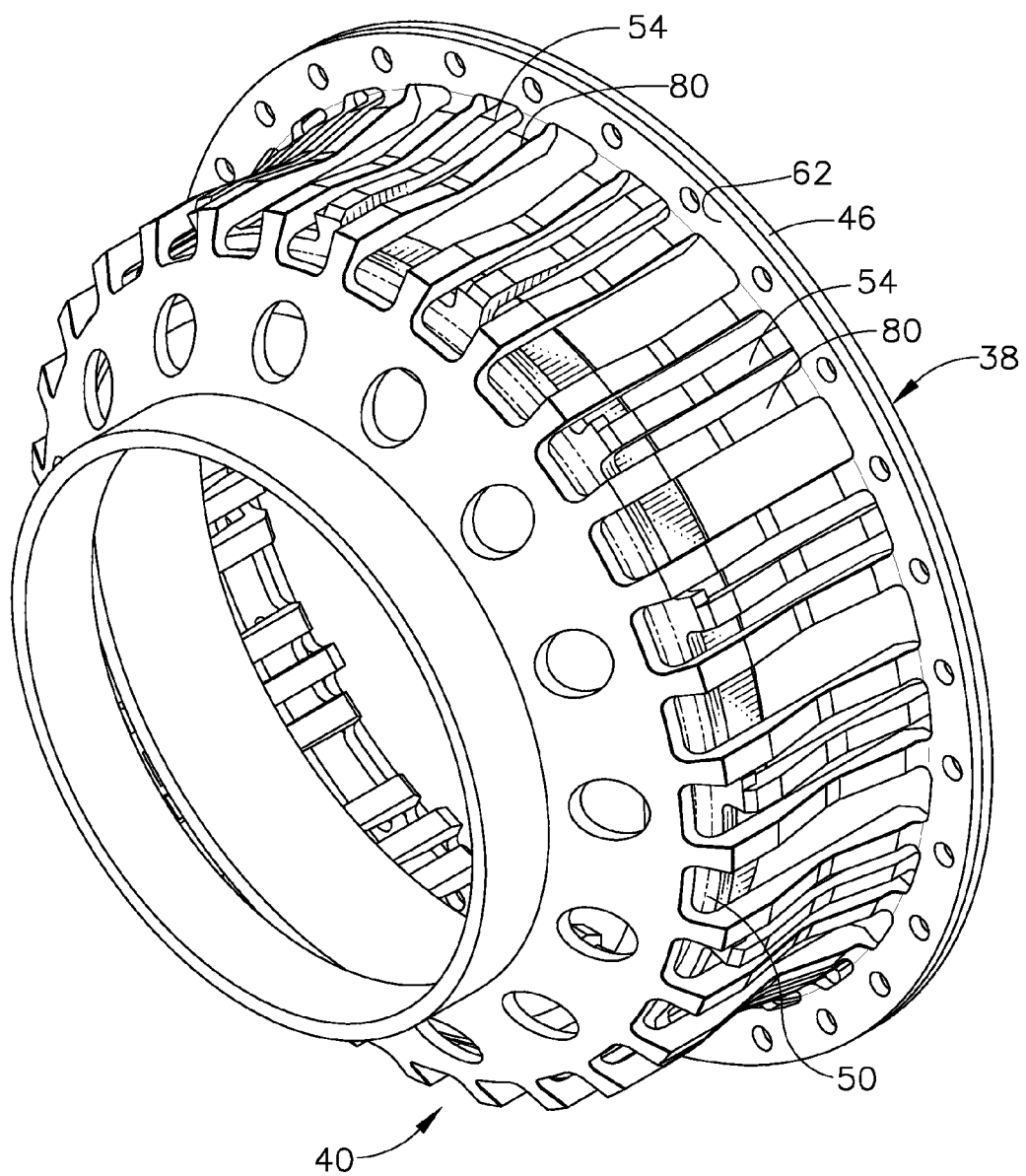
FIG. 4 is a perspective view of the bearing spring cages of FIG. 3 in an assembled relationship.

FIG. 4 shows the forward and aft bearing cages 38 and 40 in an assembled position, with the surrounding hardware removed for illustrative clarity. The forward and aft bearing cages 38 and 40 are sized such that the forward bearing cage 38 fits inside of and axially overlaps or "nests" within the aft bearing cage 40. More specifically, the outside diameter over the spring arms 54 of the forward bearing cage 38 is less than the inside diameter of the mounting flange 62 of the aft bearing cage 40. Furthermore, the spaces between adjacent spring arms 80 of the aft bearing cage 40 are selected so that the spring arms 54 of the forward bearing cage 38 will fit between them, resulting in an interdigitated configuration. Finally, the outside diameter over the bearing support ring 50 is less than the inside diameter of the spring arms 80 of the aft bearing cage 40.

In operation, the spring arms of the forward and aft bearing cages 38 and 40 are free to move independently of one another, as required by flight loads and the dynamics of the forward and aft bearings 32 and 34. This allows the harmonic response of the bearings 32 and 34 to be controlled independently.

The bearing cage configuration described above significantly reduces the axial and radial space required to fit multiple spring bearing cages into a bearing sump by nesting the cages together so they occupy the axial and radial space of one bearing cage. Engines which previously would have been unable to accommodate multiple spring bearing cages and dampers in the available sump space can now be arranged to include these features. While the nested bearing cage concept has been described with respect to a particular bearing arrangement, the concept may be used in any sump or location in the engine where it is desirable to provide multiple spring cages in a limited space.

The foregoing has described a bearing cage arrangement for a gas turbine engine. While specific embodiments of the present invention have been described, it will be apparent to those skilled in the art that various modifications thereto can be made without departing from the spirit and scope of the invention. Accordingly, the foregoing description of the preferred embodiment of the invention and the best mode for practicing the invention are provided for the purpose of illustration only and not for the purpose of limitation.

What is claimed is:

1. A bearing cage assembly for a gas turbine engine, comprising:
   (a) a first bearing cage comprising:
      (i) an annular first bearing support ring;
      (ii) an annular first mounting flange; and
      (iii) an annular array of axially-extending first spring arms interconnecting the first bearing support ring and the first mounting flange, the first spring arms defining an outer diameter;
   (b) a second bearing cage comprising:
      (i) an annular second bearing support ring;
      (ii) an annular second mounting ring, the second mounting ring defining an inner diameter greater that the outer diameter; and
      (iii) an annular array of axially-extending second spring arms interconnecting the second bearing support ring and the second mounting ring, the second spring arms defining spaces therebetween;
   (c) wherein the first bearing cage is received within the second bearing cage with the first spring arms disposed within the spaces of the second bearing cage, and the first bearing support ring disposed inside the second spring arms and radially spaced-away from the second spring arms, so as to permit independent flexing motion of the first and second spring arms.

2. The bearing cage assembly of claim 1 wherein each of the first spring arms includes:
   (a) a radially-outwardly extending portion adjacent the first mounting flange;
   (b) a central portion; and
   (c) a radially-inwardly-extending portion adjacent the first bearing support ring.

3. The bearing cage assembly of claim 1 wherein each of the second spring arms includes:
   (a) a radially-outwardly extending portion adjacent the second mounting flange;
   (b) a central portion; and
   (c) a radially-inwardly-extending portion adjacent the second bearing support ring.

4. The bearing cage assembly of claim 1 wherein the first mounting ring has a plurality of mounting holes formed therethrough.

5. The bearing cage assembly of claim 1 wherein the second mounting ring has a plurality of mounting holes formed therethrough.

6. The bearing cage assembly of claim 1 wherein the second bearing support ring comprises:
   (a) a generally axially-extending portion; and
   (b) a frustoconical skirt extending radially outward from the axially-extending portion.

7. The bearing cage assembly of claim 6 wherein the skirt has a plurality of vent holes formed therethrough.

8. The bearing cage assembly of claim 1 wherein at least one of the bearing support rings includes a cylindrical inner surface.

9. The bearing cage assembly of claim 1 wherein at least one of the bearing support rings includes an inner surface with an arcuate cross-section groove formed therein.

10. A bearing assembly for a gas turbine engine, comprising:
    (a) a first bearing cage comprising:
       (i) an annular first bearing race;
       (ii) an annular first mounting ring secured to a stationary member of the engine; and (iii) an annular array of axially-extending first spring arms interconnecting the first bearing race and the first mounting ring;
(b) a rolling-element first bearing mounted in the first bearing support ring;
(c) a second bearing cage comprising:
   (i) an annular second bearing race;
   (ii) an annular second mounting ring secured to a stationary member of the engine; and
   (iii) an annular array of axially-extending second spring arms interconnecting the second bearing race and the second mounting ring;
(d) a rolling-element second bearing mounted in the second bearing support ring; and
(e) a shaft mounted in the first and second bearings;
(f) wherein the bearing cages are nested within each other with the first spring arms disposed within spaces between the second spring arms, and the first bearing support ring disposed inside the second spring arms and radially spaced-away from the second spring arms, such that the first and second spring arms are free to move independently of each other in a radial direction.

11. The bearing assembly of claim 10 wherein each of the first spring arms includes:
(a) a radially-outwardly extending portion adjacent the first mounting flange;
(b) a central portion; and
(c) a radially-inwardly-extending portion adjacent the first bearing support ring.

12. The bearing assembly of claim 10 wherein each of the second spring arms includes:
(a) a radially-outwardly extending portion adjacent the second mounting flange;
(b) a central portion; and
(c) a radially-inwardly-extending portion adjacent the second bearing support ring.

13. The bearing assembly of claim 10 wherein the first mounting ring is secured to the stationary structure by a plurality of fasteners passing through mounting holes formed in the first mounting ring.

14. The bearing assembly of claim 10 wherein the second mounting ring is secured to the stationary structure by a plurality of fasteners passing through mounting holes formed in the second mounting ring.

15. The bearing assembly of claim 10 wherein the second bearing support ring comprises:
(a) a generally axially-extending portion; and
(b) a frustoconical skirt extending radially outward from the axially-extending portion.

16. The bearing assembly of claim 15 wherein the skirt has a plurality of vent holes formed therethrough.

17. The bearing assembly of claim 15 wherein the generally axially-extending portion of the second bearing support ring includes a cylindrical outer surface.

18. The bearing assembly of claim 17 further comprising a stationary damper housing surrounding the generally axially-extending portion of the second bearing support ring; wherein the damper housing and the generally axially-extending portion cooperatively define an oil film damper.

19. The bearing assembly of claim 10 wherein at least one of the bearing support rings includes a cylindrical inner surface.

20. The bearing assembly of claim 10 wherein at least one of the bearing support rings includes an inner surface with an arcuate cross-section groove formed therein, the groove defining an outer race for a ball bearing.

\* \* \* \* \*